United States Patent [19]

Kogure et al.

[11] 4,104,881

[45] Aug. 8, 1978

[54] PREVENTION OF OVERHEATING OF CATALYTIC CONVERTER FOR ENGINE EXHAUST GASES

[75] Inventors: Hiroshi Kogure; Junichi Shimada, both of Saitama, Japan

[73] Assignee: Honda Giken Kogyo Kabushiki Kaisha, Tokyo, Japan

[21] Appl. No.: 684,064

[22] Filed: May 6, 1976

[30] Foreign Application Priority Data

May 12, 1975 [JP] Japan ................................ 50-56433

[51] Int. Cl.² .............................................. F02B 75/10
[52] U.S. Cl. .................................. 60/299; 123/97 B; 123/117 A; 123/119 D; 123/124 B
[58] Field of Search ............ 123/97 B, 117 A, 119 D, 123/119 DB, 124 R, 124 B; 60/274, 285, 282, 299, 900, 277

[56] References Cited

U.S. PATENT DOCUMENTS

| | | | |
|---|---|---|---|
| 3,577,727 | 5/1971 | Warren | 60/292 |
| 3,590,793 | 7/1971 | Masaki | 123/97 B |
| 3,744,464 | 7/1973 | Soltau | 123/119 D |
| 3,768,787 | 10/1973 | Marsee | 123/119 A |
| 3,826,089 | 7/1974 | Nakajima | 60/306 |
| 3,982,507 | 9/1976 | Asaka | 123/97 B |
| 3,982,513 | 9/1976 | Nakagawa | 123/119 D |
| 3,994,268 | 11/1976 | Okunishi | 123/97 B |

*Primary Examiner*—Douglas Hart
*Attorney, Agent, or Firm*—Lyon & Lyon

[57] ABSTRACT

Overheating of a catalytic converter receiving exhaust gases from an internal combustion engine is minimized by providing an air-fuel mixture leaner than the stoichiometric ratio for combustion in the engine, maintaining the exhaust gases in an exhaust reaction chamber at relatively high temperature for a relatively long time period before conveying them to the catalytic converter, sensing deceleration conditions in the engine as a function of increase in intake vacuum intensity, and retarding the spark ignition timing and introducing supplemental air for combustion upon increase in vacuum intensity.

3 Claims, 1 Drawing Figure

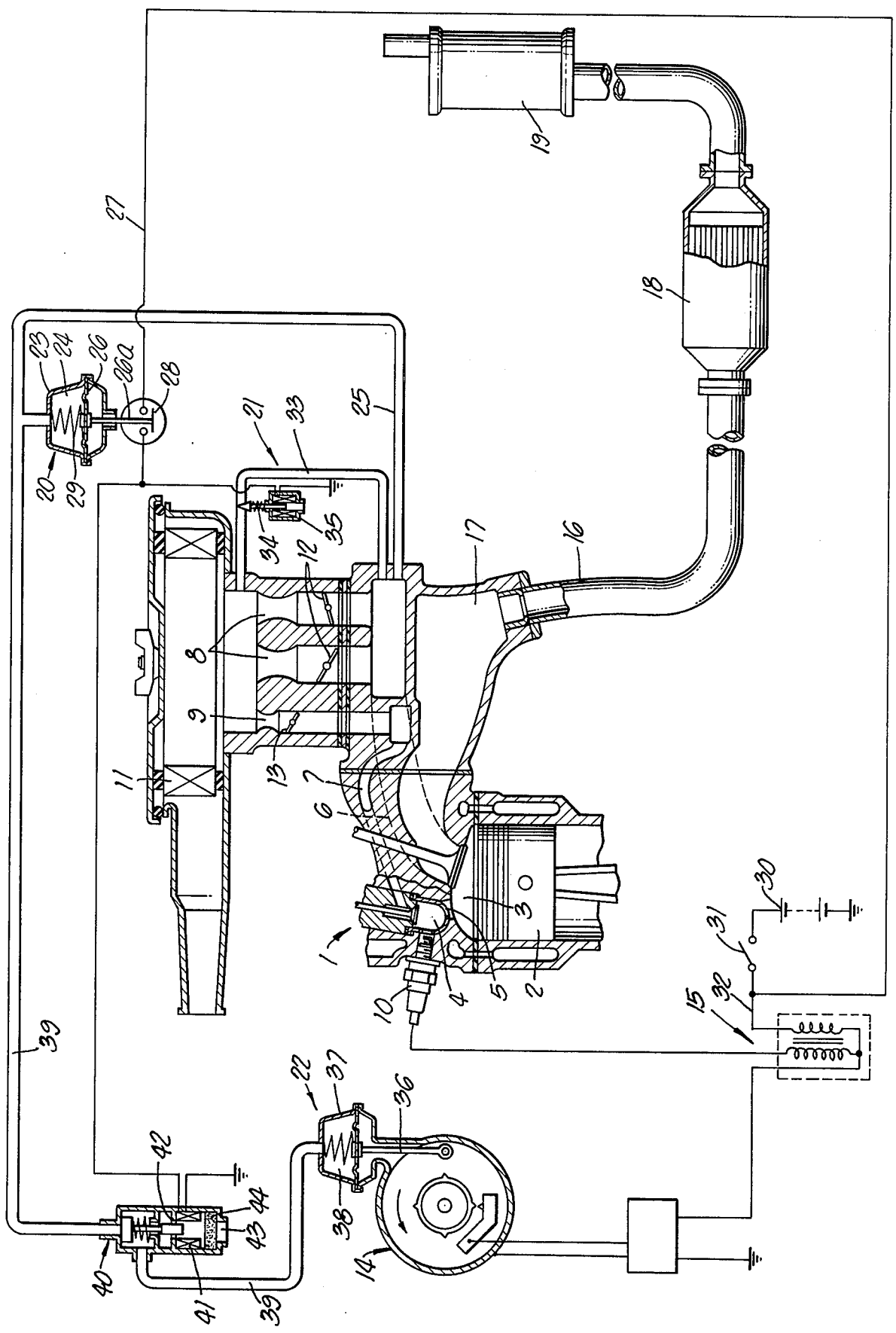

PREVENTION OF OVERHEATING OF CATALYTIC CONVERTER FOR ENGINE EXHAUST GASES

This invention relates to internal combustion engines of the type employing a catalytic converter for oxidizing undesirable unburned components in the exhaust gases before discharging them into the atmosphere. This invention is particularly directed to a method and apparatus for preventing premature damage and failure of the catalytic converter caused by overheating. This result is accomplished by reducing the concentration of pollutants delivered to it during engine deceleration periods. The engine is caused to burn a mixture having an overall air-fuel ratio less than the stoichiometric ratio so that there is an excess of oxygen in the exhaust gases. During engine deceleration, the intensity of the intake vacuum increases because the throttle valve or valves are substantially closed. This increase in vacuum intensity causes droplets of fuel previously adhering to the walls of the intake passages to be carried into the combustion chamber, and it also causes increased fuel flow from the slow jet nozzles of the carburetor. The resulting increase in richness of the mixture may cause misfire to occur, and in any event produces more unwanted pollutants to be oxidized in the catalytic converter.

In accordance with this invention, the increase in richness of the intake mixture during deceleration of the engine is minimized by inducting supplemental air, and more complete combustion is achieved by retarding the ignition timing. An exhaust reaction chamber is placed close to the engine to receive hot exhaust gases and to maintain them at a relatively high temperature for a relatively long period of time. The excess oxygen serves to oxidize a major portion of the pollutants produced during the engine deceleration period. This results in a lighter load for the catalytic converter and prevents overheating. This in turn increases its service life.

The drawing is a schematic diagram, partly in section, and showing a preferred embodiment of this invention.

Referring to the drawing, the internal combustion engine 1 is of the torch ignition type having an overall air-fuel ratio which is leaner than stoichiometric. The piston 2 forms one wall of the main combustion chamber 3, and an auxiliary combustion chamber 4 is connected to the chamber 3 through an opening or torch nozzle 5. A main carburetor 8 produces a lean mixture and is connected through main intake passage 6 to the main combustion chamber 3. An auxiliary carburetor 9 produces a rich mixture and is connected through auxiliary intake passage 7 to the auxiliary combustion chamber 4. An air cleaner 11 supplies atmospheric air to both carburetors 8 and 9. The carburetors 8 and 9 are adjusted so that the overall air-fuel ratio of mixtures produced by them is leaner than the stoichiometric air-fuel ratio. Throttle valves 12 are provided for the lean mixture and a throttle valve 13 is provided for the rich mixture. A spark plug 10 communicates with the auxiliary combustion chamber 4 and is connected to a conventional ignition system 14 and ignition circuit 15.

An exhaust reaction chamber 17 is placed as close as possible to the engine 1 and receives exhaust gases from the main combustion chamber 3. A catalytic converter 18 is placed downstream from the reaction chamber 17, connected therero by exhaust conduit 16, and a silencer 19 is installed downstream from the catalytic converter 18.

The engine 1 is provided with a sensor system 20 that senses engine deceleration and generates electric signals. The engine is also provided with a secondary air induction system 21 which acts in response to such electric signals to induct secondary air into the air-fuel mixture produced by the main carburetor and downstream from the throttle valves 12. The engine 1 also employs a spark retarder system 22 which is responsive to electric signals generated by the sensor system 20 to retard the ignition timing of the ignition system 14.

The sensor system 20 has a case 23 fixed to the engine 1 at a suitable location. A flexible diaphragm 26 cooperates with the case 23 to form a vacuum chamber 24 which is connected to the main intake passage 6 downstream from the main throttle valves 12 by way of a vacuum detection passage 25. The underside of the flexible diaphragm 26 is open to atmosphere. A rod 26a connects the center of the diaphragm 26 to an electrical switch 28. This switch 28 is included in an electric signal circuit 27, described below, which has the function of forming a signal generation unit. A spring 29 in the vacuum chamber 24 acts in a direction to move the electric switch 28 to open position. The pressure receiving area of the flexible diaphragm 26 and the force of the spring 28 are chosen so that, when the intake vacuum of the engine 1 during deceleration is induced into the vacuum chamber 24, the flexible diaphragm 26 moves upward against the action of the spring 29. The electric signal circuit 27 is branched off from an electric circuit 32 that connects the engine ignition circuit 15 to a power source 30 through a main switch 31.

The secondary air induction system 21 comprises a secondary air induction passage 33 that is connected to the main intake passage 6 downstream from the main throttle valves 12. The system 21 also includes a normally closed electromagnetic valve 34 placed in the passage 33, the solenoid 35 of the valve 34 being connected to the electric signal circuit 27 so that it is energized when the switch 28 is closed.

The spark retarder system 22 comprises a vacuum actuator 37 connected to an ignition timing adjustment member 36 with which the ignition system 14 is provided. The system 22 also includes a vacuum induction passage 39 that is branched off from said vacuum detection passage 25 and connected to the vacuum chamber 38 of the vacuum actuator 37. A three-way electromagnetic selector valve 40 is placed in the vacuum induction passage 39.

The vacuum actuator 37 is constructed to pull the ignition timing adjustment member 36 to retard the ignition timing of the ignition system 14 to a predetermined degree. The three-way electromagnetic selector valve 40 is connected to the electric signal circuit 27 so that its solenoid 41 is in parallel with the solenoid 35 of the electromagnetic valve 34. A third port 42 of the three-way electromagnetic selector valve 40 is connected to an air inlet 43 through an air filter 44.

In operation, lean mixture is supplied to the main combustion chamber 3 and rich mixture is supplied to the auxiliary combustion chamber 4, during the intake stroke of the engine. At the end of the following compression stroke, the rich mixture in the auxiliary combustion chamber 4 is ignited by the spark plug 10, generating a flame which passes through the torch nozzle 5 to burn the lean mixture in the main combustion chamber 3. Thus, the engine 1 is operated on a mixture whose overall air-fuel ratio is leaner than the stoichiometric ratio.

During normal engine operation, exhaust gases discharged from the main combustion chamber 3 are maintained at a relatively high temperature and for a relatively long period of time in the reaction chamber 17. Unburned components in the exhaust gas are oxidized by the high temperature excess oxygen in the exhaust gases. The quantities of unburned components are particularly high immediately after the startup of the engine when the reaction chamber 17 has not yet been heated to activation temperature. Any unburned components which do pass through the reaction chamber 17 are subjected to an oxidizing reaction in the catalytic converter 18, and the gases are then discharged through the silencer 19 into the atmosphere.

Under such normal operating conditions, the diaphragm 26 of the sensor system 20 does not respond to intake vacuum of the engine as reflected in the vacuum detection passage 25. Thus, the electric switch 28 is held in open position, so that the electromagnetic valve 34 maintains its closed position to shut off the secondary air induction passage 33. Also, the three-way electromagnetic selector valve 40 shuts off the vacuum induction passage 39 and at the same time connects the downstream side thereof to the air inlet 43, so that the vacuum actuator 37 remains inactive.

During a long period of engine deceleration, however, occasioned by closing of the throttle valves 12 and 13, the intake vacuum is intense downstream from the throttle valves, with the result that liquid droplets of fuel adhering to the internal walls of the main and auxiliary intake passages 6 and 7 are carried into the main combustion chamber 3 and auxiliary combustion chamber 4. Moreover, fuel injected through the slow jet nozzles of the main and auxiliary carburetors suddenly increases in quantity, so that the air-fuel ratio in each combustion chamber is likely to be excessively rich. At this time the intense vacuum is detected by the sensor system 20 and is applied to the vacuum chamber 24 to cause the diaphragm 26 to move against the action of the spring 29. This closes the switch 28 to energize the electric signal circuit 27. As a result, the electromagnetic valve 34 and the electromagnetic selector valve 40 are energized to cause movements of their respective armatures. In this way the valve 34 opens the passage 33 to supply secondary air to the main intake passage 6, and the valve 40 causes the intense vacuum to act in the vacuum actuator 37 to cause the rod 36 to be retracted and thereby retard the ignition timing of the ignition system 14.

The results are that secondary air is supplied to the intake passage 6 by diluting over-rich mixture to prevent misfire at the time of ignition. Furthermore, retarding of the ignition timing causes combustion of the mixture to extend further into the exhaust stroke. This minimizes exhaust temperature drop caused by reduction in the charging efficiency resulting from closing of both throttle valves 12 and 13. The oxidizing reaction of the exhaust gases in the reaction chamber 17 continues to take place efficiently, and the amount of unburned components reaching the catalytic converter 18 is materially reduced, so that the catalytic converter 18 is not overheated by the oxidizing reactions. Thus, the load on the catalytic converter 18 is materially reduced without adversely affecting the purifying action of the exhaust gases. The result is that the service life of the catalytic converter is considerably extended.

Having fully described our invention, it is to be understood that we are not to be limited to the details herein set forth but that our invention is of the full scope of the appended claims.

We claim:

1. Apparatus for preventing overheating of a catalytic converter receiving exhaust gases from an internal combustion spark-ignition engine comprising, in combination: an exhaust reaction chamber interposed between said engine and said catalytic converter, means including at least one throttle valve for supplying an air-fuel mixture leaner than the stoichiometric ratio for combustion in the engine, auxiliary means including an intake passage for supplying an air-fuel mixture richer than the stoichiometric ratio for ignition and combustion in the engine, sensing means for sensing deceleration conditions in the engine by sensing an increase in intensity of intake vacuum, means responsive to said increase for retarding the spark ignition timing, and means responsive to said increase for introducing supplemental air downstream from the throttle valve to reduce the air-fuel ratio of the mixture received for combustion by the engine during deceleration from the means including at least one throttle valve.

2. Apparatus for preventing overheating of a catalytic converter receiving exhaust gases from an internal combustion spark-ignition engine comprising, in combination: an exhaust reaction chamber interposed between said engine and said catalytic converter, main carburetion means for supplying an airfuel mixture leaner than the stoichiometric ratio for combustion in the engine, auxiliary carburetion means for supplying an airfuel mixture richer than the stoichiometric ratio for ignition and combustion in the engine, sensing means for sensing deceleration conditions in the engine by sensing an increase in intensity of intake vacuum, an electric switch closed by said sensing means, and electrically operated means responsive to closing of said electric switch for retarding the spark ignition timing, and for introducing supplemental combustion air in said main carburetion means.

3. Apparatus for preventing overheating of a catalytic converter receiving exhaust gases from an internal combustion spark-ignition engine comprising, in combination: an exhaust reaction chamber interposed between said engine and said catalytic converter, a first carburetor for supplying a relatively large amount of lean air-fuel mixture for combustion in the engine, a second carburetor for supplying a relatively small amount of rich air-fuel mixture for combustion in the engine, the overall air-fuel ratio of both mixtures being leaner than the stoichiometric ratio, each carburetor having a throttle valve, main intake passage means for conveying said lean air-fuel mixture from said first carburetor for combustion in the engine, auxiliary intake passage means for conveying said rich air-fuel mixture from said second carburetor for combustion in the engine, sensing means for sensing deceleration conditions in the engine by sensing an increase in intensity of intake vacuum, means responsive to said increase for retarding the spark ignition timing, and means responsive to said increase for introducing supplemental air downstream from the throttle valve for the lean mixture into said main intake passage means.

* * * * *